United States Patent [19]
Adams

[11] Patent Number: 4,580,651
[45] Date of Patent: Apr. 8, 1986

[54] POWER ASSISTANCE STEERING SYSTEM FOR A VEHICLE

[75] Inventor: Frederick J. Adams, Clevedon, England

[73] Assignee: TRW Cam Gears Limited, Clevedon, England

[21] Appl. No.: 654,382

[22] Filed: Sep. 25, 1984

[30] Foreign Application Priority Data

Sep. 28, 1983 [GB] United Kingdom ............... 8325863

[51] Int. Cl.⁴ ............................................... B62D 5/06
[52] U.S. Cl. .................................. 180/142; 180/148
[58] Field of Search .................. 180/142, 148, 79.1, 180/132, 136, 138, 139; 74/388 PS

[56] References Cited

U.S. PATENT DOCUMENTS

| | | | |
|---|---|---|---|
| 4,223,254 | 9/1980 | Adams | 180/79.1 X |
| 4,279,323 | 7/1981 | Ando et al. | 74/388 PS |
| 4,387,782 | 6/1983 | Leiber | 180/142 X |
| 4,471,280 | 9/1984 | Stack | 180/79.1 X |
| 4,476,529 | 10/1984 | Nakamura et al. | 180/142 X |

FOREIGN PATENT DOCUMENTS

| | | | |
|---|---|---|---|
| 1655316 | 6/1979 | Fed. Rep. of Germany | 180/79.1 |
| 0075267 | 6/1981 | Japan | 180/79.1 |
| 0104339 | 6/1983 | Japan | 123/339 |
| 1233190 | 5/1971 | United Kingdom | 180/132 |

*Primary Examiner*—Harry Tanner
*Attorney, Agent, or Firm*—Yount & Tarolli

[57] ABSTRACT

A power assistance steering system for a vehicle, including a fluid pump which directs fluid pressure selectively to a movement assistance device to assist steering and a prime mover for driving the pump through a microprocessor in accordance with signals generated by a sensor responsive to steering torque.

13 Claims, 8 Drawing Figures

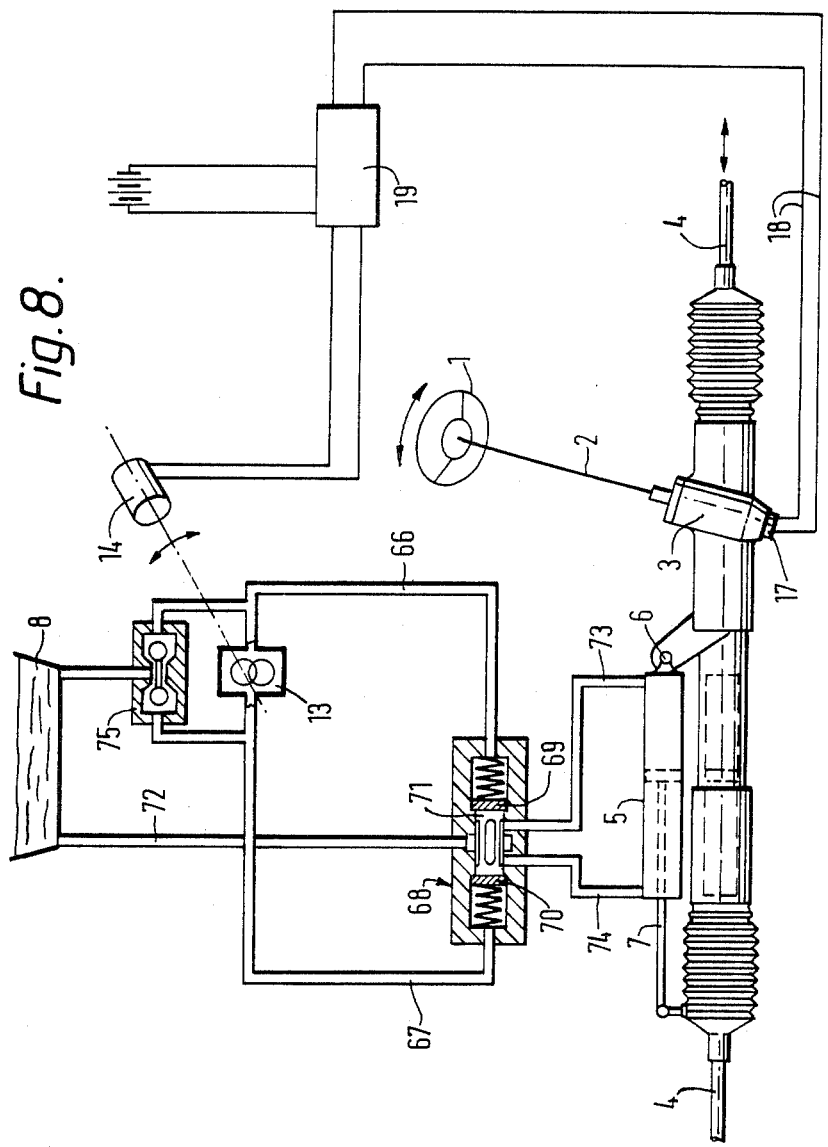

4,580,651

POWER ASSISTANCE STEERING SYSTEM FOR A VEHICLE

INTRODUCTION

This invention relates to a power assistance steering system for a vehicle.

Power assistance steering systems for motor vehicles are well known and conventionally include a source of fluid pressure which is selectively directed to a ram mechanism through a fluid direction control valve. This fluid direction control valve is responsive to steering torque to contol the fluid pressure being fed to the ram mechanism.

The manufacture of such fluid direction control valves is complicated in that they have to be accurately machined and are therefore expensive to produce.

OBJECT OF THE INVENTION

It is the main object of this invention to provide a low cost power assistance steering system for a vehicle.

STATEMENTS OF INVENTION

According to one aspect of the present invention there is provided a power assistance system for a steering mechanism of a vehicle, said mechanism having interengaging first and second members, including a fluid pressure responsive movement assistance device to assist steering and means for selectively directing fluid pressure to said device in accordance with signals generated by a sensor dependent on movement of at least part of one of said members in response to steering.

Said first member may be a rack and said second member may be a pinion and the signals may be generated by axial movement of at least part of the pinion.

According to another aspect of the present invention there is provided a power assistance steering system for a vehicle, including a fluid pump for directing fluid pressure selectively to a movement assistance device to assist steering and a prime mover for driving said pump in accordance with signals generated by a sensor responsive to steering.

The fluid may be part of a fluid pressure system including two opposed one way valves permitting selective fluid flow to the movement assistance device.

DRAWINGS

FIG. 8 is a diagrammatic view of a further form of power assistance steering mechanism.

SPECIFIC DESCRIPTION

Figure 1:
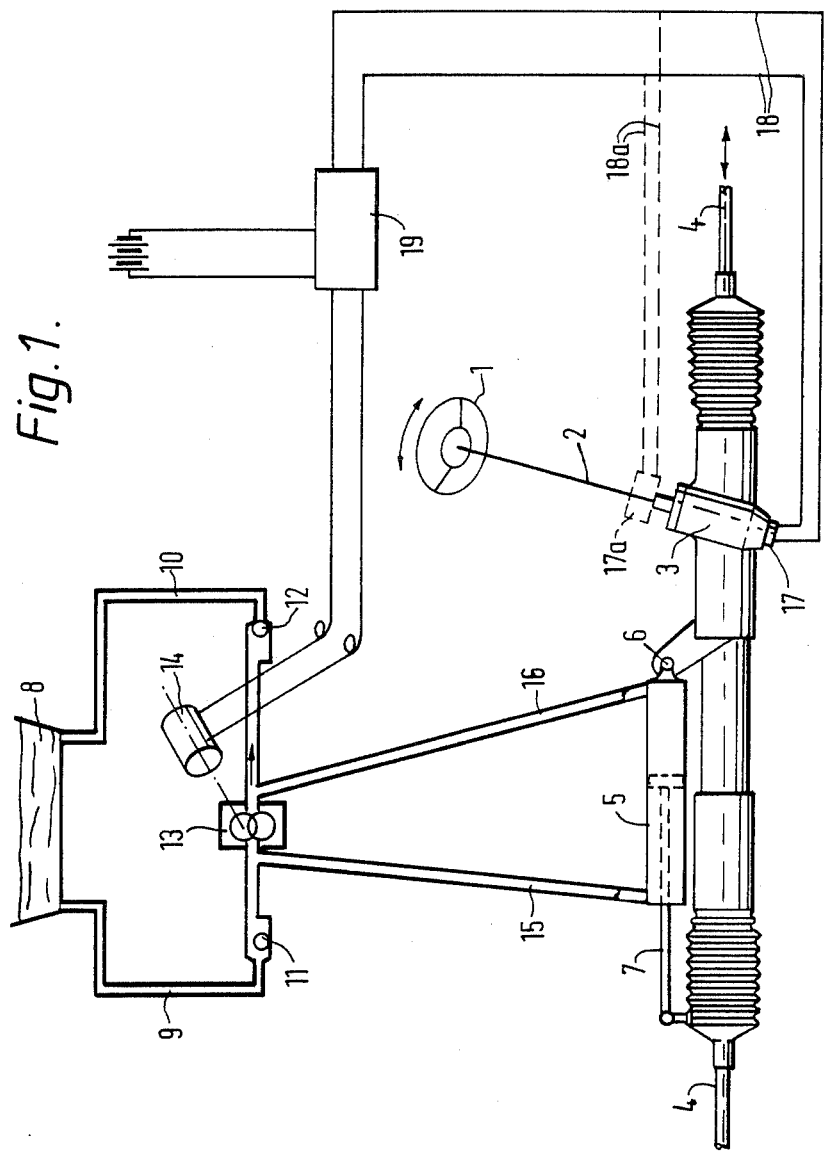
FIG. 1 is a diagrammatic view of a first embodiment of a power assistance steering system.

Referring first to FIG. 1 which illustrates a basic power assistance steering system for a rack and pinion steering mechanism in a vehicle, there is illustrated a steering wheel 1 with a torque transmitting steering column 2 leading to a rack and pinion steering assembly in housing 3. Movement transmitting rods 4 lead to the steered wheels in known manner.

A ram 5 or other movement assistance device has its cylinder part fixed at 6 and its piston part attached through links 7 to assist in the axial movement of rods 4 again in known manner. The movement assistance device may be integral with the rod 4.

Fluid is stored in reservoir 8 and passes through pipes 9 and 10 through one way valves 11 and 12 dependent upon the sense of rotation of a pump 13 driven by a reversible electric motor or other reversible prime mover 14. Fluid pressure generated by pump 13 is applied via pipes 15 and 16 selectively to one or other of the sides of the piston of ram 5.

The one way valves 11 and 12 may be omitted from the system and the pump 13 simply drive selectively to either side of the ram 5 through pipes 15 and 16. However, if the ram 5 is of the type in which different pressure areas are present on the opposite sides of the piston, provision must be made for the differential flow of the fluid dependent on the direction of movement of the piston. Such provision may be achieved by the one way valves 11 and 12 or their equivalent or by the embodiment of FIG. 8 which will later be described.

Attached to the housing 3 of the rack and pinion assembly is a torque sensor 17 having electrical connections 18 leading to a microprocessor 19 charged by batteries 20 and the output from the microprocessor 19 being fed via leads 21 to electric motor 14.

Alternatively, the torque sensor 17a is in the form of a rotary device which transmits a signal via electrical connection 18a.

More details of the precise components will be described later but suffice to say at the moment that any significant amount of steering torque applied at steering wheel 1 will be converted into an electrical signal by sensor 17 or 17a, fed to the microprocessor 19 which in turn will feed an appropriate signal to electric motor 14. The motor will turn and drive pump 13 in the appropriate direction to pressurise one or other side of the piston of ram 5 to assist in movement of the steering rods 4. There will, of course, be direct drive through steering column 2 to rods 4 as is conventional practice.

Figure 2:
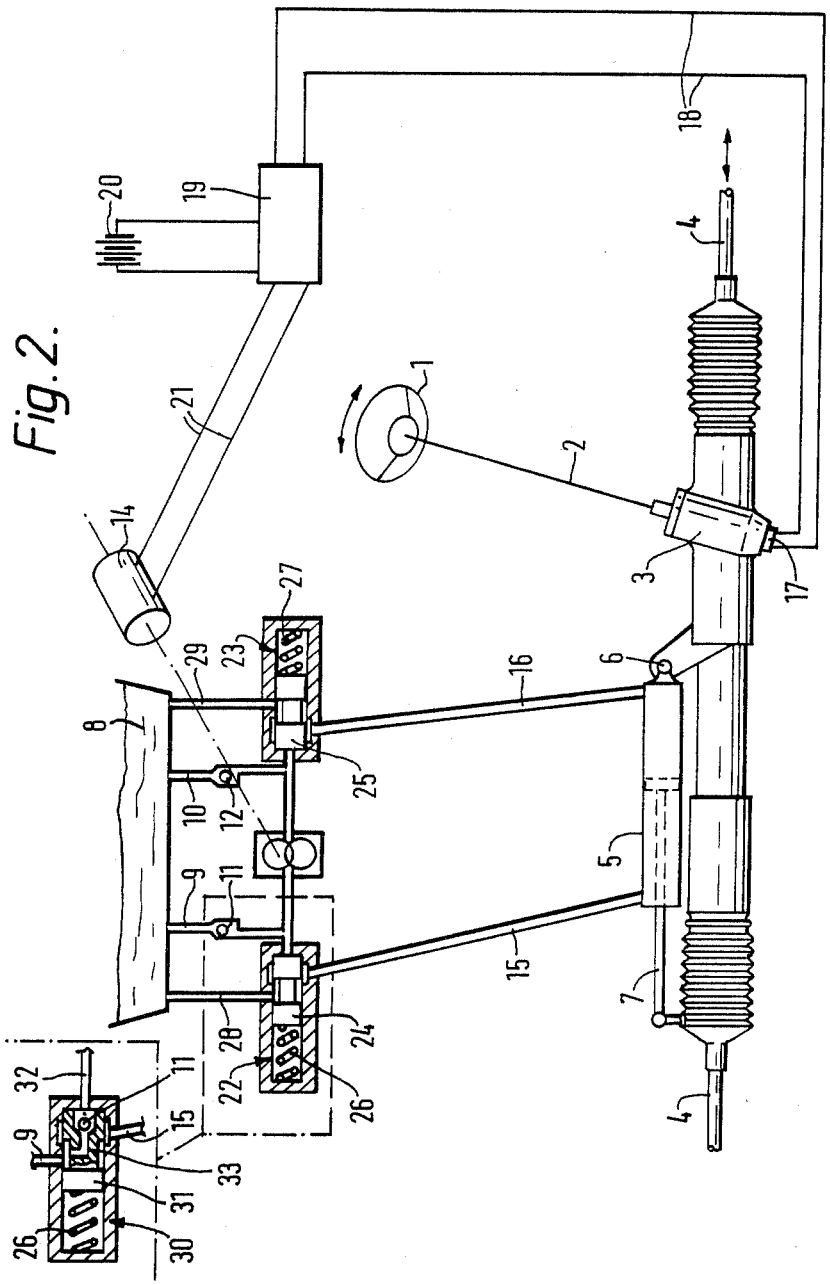
FIG. 2 is a diagrammatic view of a second embodiment of a power assistance steering system.

In FIG. 2 and the remaining figures, like parts have been given like reference numerals to accord with FIG. 1.

Referring now to FIG. 2, in this embodiment in addition to the opposed one way valves 11 and 12 there are provided spool valves 22 and 23, the spools 24 and 25 of which are held in the position shown in the drawing by light springs 26 and 27 respectively. These spool valves 22 and 23 have additional pipes 28 and 29 respectively leading back to reservoir 8.

The purpose of the spool valves 22 and 23 is to permit an unrestricted flow of fluid back through pipes 15 or 16 which may be caused by a very increased torque being applied through steering wheel 1 or shock loading conditions causing fluid to flow through spool valves 22 and 23 and pipes 28 and 29 back to reservoir 8. These spool valves 22 and 23 also assist in the rapid centering of the piston of ram 5. The spool valves 22 and 23 do not affect the fluid pressure applied through pipes 15 and 16 from pump 12 because the spools 24 and 25 are easily moved against their springs 26 and 27 respectively.

A variation of this embodiment in which one of the one way valves and one of the spool valves are combined into a single valve is indicated at 30 and this avoids the use of pipe 28. Pipe 9 extends from the reservoir 8 directly between the lands of modified spool 31 and connects to pipe 32 which leads to pump 13 via internal passageway 33 within which is one way valve 11. The valve 30 operates as previously described in connection with the separate valves 11 and 22.

Figure 3:
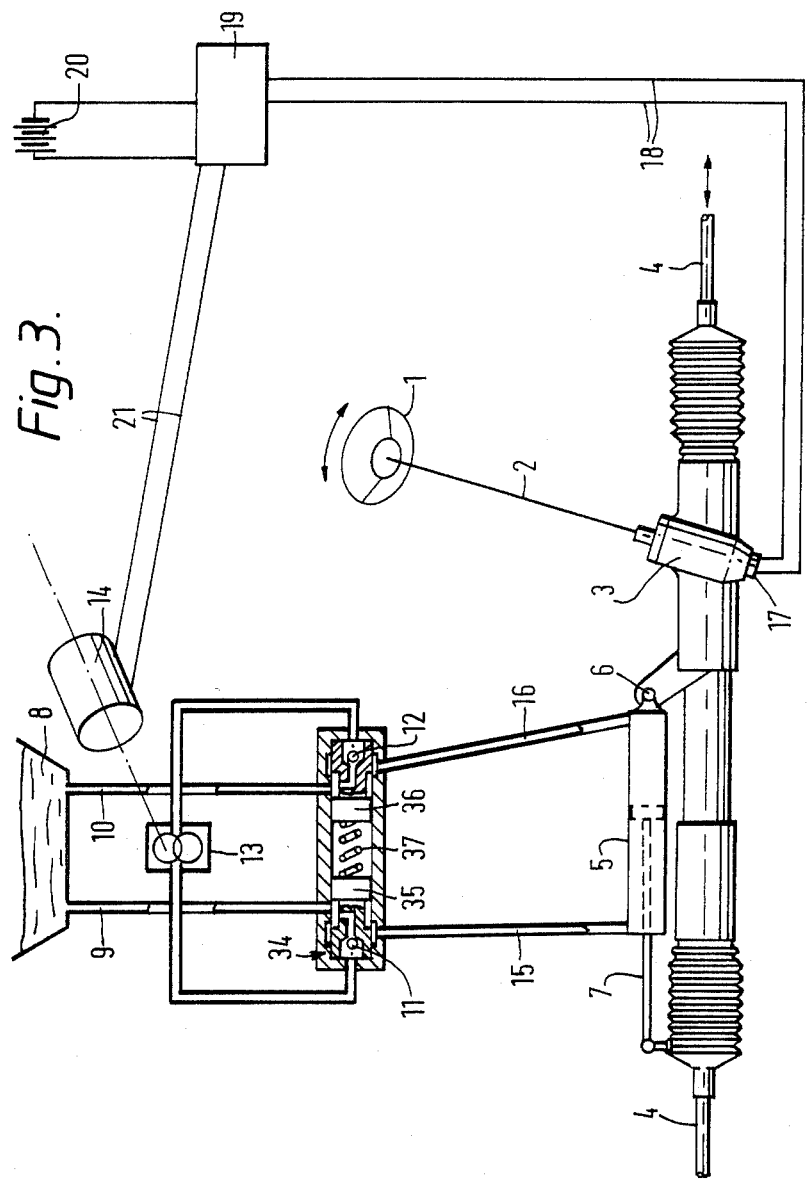
FIG. 3 is a diagrammatic view of a modification of the system of FIG. 2.

Referring now to FIG. 3 which shows a modification of the embodiment of FIG. 2 and in particular a valve arrangement 34 which combines the two valves 30 of the FIG. 2 embodiment. In the FIG. 3 embodiment fluid is fed via pipes 9 and 10 to between the lands of spools 35 and 36 respectively which incorporate one way valves 11 and 12. The spools 35 and 36 are spring loaded by common light spring 37.

The FIG. 3 embodiment operates in a manner similar to that of FIG. 2 and permits rapid return of fluid pressure from ram 5 to reservoir 8 through either pipe 15 or pipe 16.

Figure 4:
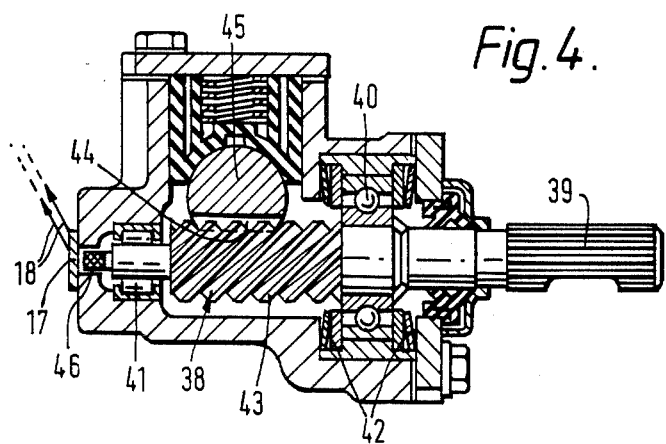
FIG. 4 is a cross-sectional view showing a first form of rack and pinion mechanism.

A first embodiment of an axially moveable pinion in a rack and pinion assembly is illustrated in FIG. 4. A pinion 38 is provided with a splined end 39 for attachment to steering column 2 and is mounted for rotation in bearings 40 and 41 and centered against axial movement by springs 42. The pinion is provided with helical teeth 43 which engage inclined teeth 44 of rack 45.

At the free end of pinion 38 is a permanent magnet 46 located in its rest position adjacent to the sensor 17. This sensor may be what is known as a "Hall" sensor or any other type of sensor which is sensitive to the movement of a nearby permanent magnet.

In operation, a very small amount of torque from the steering wheel will be transmitted directly from the pinion to the rack without overcoming the centering of the pinion by springs 42. However, if more substantial torque is applied, the pressure of one of the springs 42 will be overcome and due to the angular contact of the helical teeth 43 of the pinion and the similarly inclined teeth 44 of the rack, axial movement of the pinion will take place. The magnetic field generated by permanent magnet 46 will cause a signal to be generated in sensor 17, this signal being dependent upon the degree of the movement between the magnet 46 and the sensor 17. This movement will be transmitted to the microprocessor 19 which will generate a signal to send to the motor 14 to turn the pump 13 at sufficient speed to raise the fluid pressure at one side of the piston in ram 5 to give the required speed of movement to assist in steering the vehicle.

As soon as the steering torque from steering wheel 1 ceases, then the springs 14 will re-centralise the pinion 38 in preparation for the next steering movement.

Figure 5:
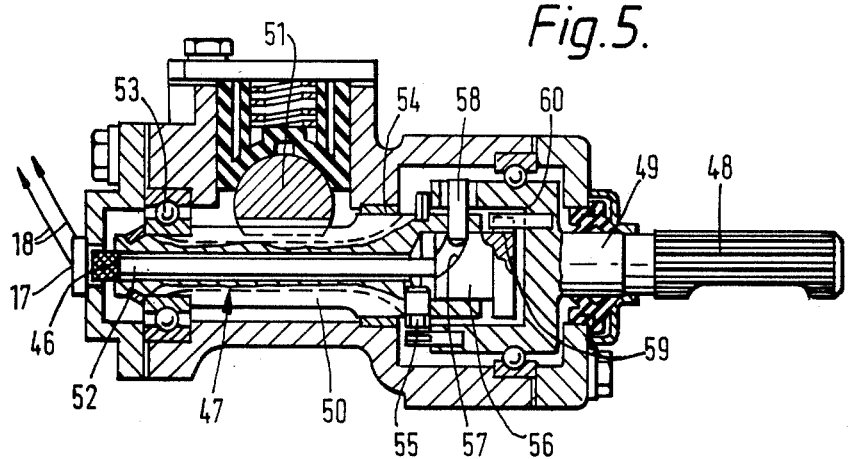
FIG. 5 is a cross-sectional view showing a second form of rack and pinion steering mechanism.

FIG. 5 shows a second embodiment of rack and pinion steering mechanism. The pinion 47 is provided with splines 48 for attachment to the steering column 2. The pinion 47 is made in three main parts, namely, the head portion 49 which includes the splined shaft 48, the outer pinion part 50 which is provided with axial teeth to engage lateral teeth of rack 51 in normal manner and a central rod part 52 which is the axially moveable part of the pinion mechanism. The central rod part 52 is free for rotation within outer pinion part 50 and is capable of axial movement in relation thereto. The outer pinion part 50 is mounted for rotation in bearings 53 and 54 and is connected to head part 49 through springs 55 which centre the head part 49 in relation to the outer pinion part 50 when no significant torque is being transmitted.

An enlarged portion 56 of the central rod 52 is provided with a cam surface 57 engaged by a pin 58 mounted on the head part 49. The enlarged part 56 also contains a slot 59 within which extends a pin 60 fixed on head part 49 thus enabling central rod part 52 to rotate and move axially within outer pinion part 50.

If significant torque is applied to part 49, this will rotate both the part 49 and the central rod part 52. The springs 55 will give and the engagement of pin 58 with cam 57 will move central rod part 52 axially one way or the other dependent upon the sense of rotation of part 49 and, as in the previous embodiment, a magnet 46 will create a signal in sensor 17 which signal will be sent via wires 18 to the microprocessor. As soon as the steering torque ceases, the springs will axially re-centralise the central part 52 ready for the next steering movement.

Figure 6:
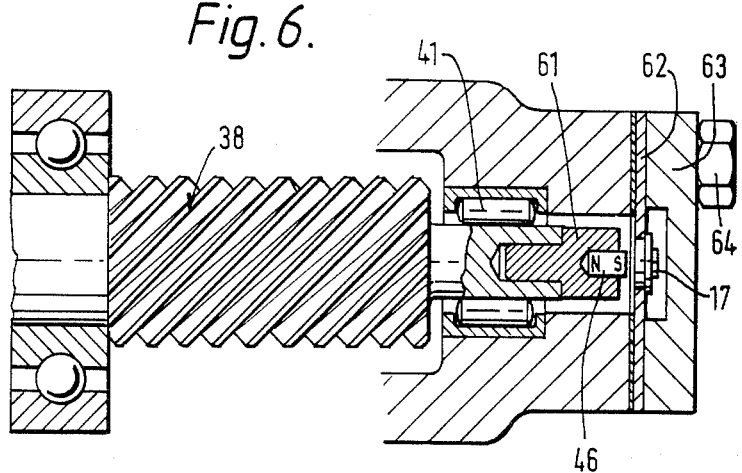
FIG. 6 is a cross-sectional scrap view illustrating sensor mechanism.

FIG. 6 shows in more detail the magnet and sensor arrangement and relates in particular to the embodiment of FIG. 4. The pinion 38 has at its free end the permanent magnet 46. This is mounted in a brass plug 61. The sensor 17 is mounted on a brass plate 62 and a brass cover 63 is secured by bolts 64. A small air gap is left between the free end of the magnet 46 and the sensor 17 to permit axial movement of the pinion.

Figure 7:
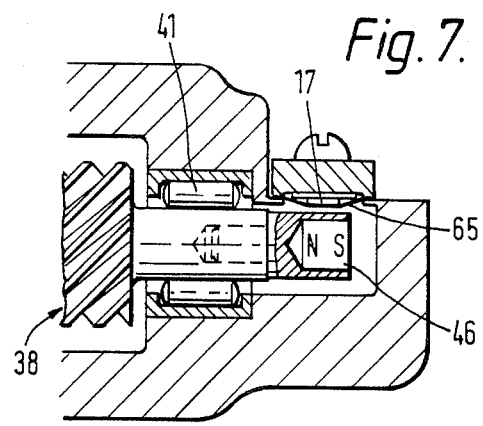
FIG. 7 is a cross-sectional scrap view illustrating an alternative form of sensor mechanism.

A modified arrangement for the sensor is shown in FIG. 7 in which the sensor 17 is placed at the side of the magnet 46 separated by a gasket 65.

The sensor may be sensitive solely to the direction of steering if a nonsophisticated system is satisfactory but may alternatively be sensitive not only to the direction of steering but also to steering torque.

A further embodiment is shown in FIG. 8 in which, as before, a prime mover 14 drives a fluid pump 13 selectively one way or the other dependent on steering from steering wheel 1. This pump 13 pressurises fluid in pipes 66 or 67 which lead to opposite sides of shuttle valve 68 having opposed plates 69 and 70 each spring urged to a seated position. Between the plates 69 and 70 lies a shuttle 71 axially movable but centralised by the springs of plates 69 and 70. The seating surfaces of plates 69 and 70 are provided with grooves or the like which allow fluid communication from pipes 66 and 67 to the shuttle which has flats and grooves to permit fluid to pass via pipe 72 to the reservoir 8 or to pipe 73 from pipe 66 or to pipe 74 from pipe 67. A fluid feed valve 75 is provided between the reservoir 8 and both sides of the pump 13.

The operation of this embodiment is that when the steering wheel 1 is rotated and the motor 14 drives pump 13 in one direction, fluid flows in pipe 66, past plate 69 and forces shuttle 71 to the left as seen in FIG. 8. This permits fluid flow via pipe 73 to the right hand end of the ram 5, return fluid flowing via pipe 74 and pipe 72 to the reservoir and pipe 67 to the other side of pump 13. Turning of the steering wheel in the opposite direction causes the motor 14 to rotate the pump 13 in the opposite sense and force the shuttle to the right as seen in the Figure. This pressurises the left hand side of ram 5.

This last embodiment is eminently suitable if the ram is of the differential pressure type.

I claim:

1. A power assistance steering system for pivoting steerable wheels of a vehicle in opposite directions in response to manual turning of a steering wheel in opposite directions, said power assisted steering system comprising:
- a pinion member rotatable in respective opposite directions in response to turning of the steering wheel in the respective opposite directions,
- a rack member movable in response to rotation of said pinion member to effect pivoting of said steerable wheels in said opposite directions,
- fluid pressure means having opposite chambers for providing power assistance to movement of said rack,
- pump means for selectively directing fluid pressure to said opposite chambers of said fluid pressure means,
- reversible motor means for selectively driving said pump means in opposite directions to provide for selectively directing fluid pressure to said opposite chambers of said fluid pressure means, and
- sensor means for sensing the movement of one of said pinion and rack members for controlling operation of said reversible motor means for selectively driving said pump means in a respective one of said opposite directions in accordance with the movement of said one of said pinion and rack members.

2. A power assistance steering system as claimed in claim 1 wherein said sensor means senses the direction of steering movement.

3. A power assistance steering system as claimed in claim 2 wherein said sensor means also senses the steering torque.

4. A power assistance steering system as claimed in claim 1 wherein said power assisted steering system includes means supporting said pinion member for axial movement in response to a predetermined turning of the steering wheel, and said sensor means senses the axial movement of said pinion member.

5. A power assistance steering system as claimed in claim 1 wherein said pinion and rack members have helical teeth which cooperate to effect axial movement of said pinion member in response to a predetermined turning of the steering wheel, said sensor means sensing the axial movement of said pinion member.

6. A power assistance steering system as claimed in claim 4 or 5 including spring means for axially centering said pinion member.

7. A power assistance steering system as claimed in claim 1 wherein said power assisted steering system includes a part rotatable with said pinion member and axially movable relative thereto, and said sensing means senses axial movement of said part.

8. A power assistance steering system as claimed in claim 7 comprising cam means for effecting axial movement of said part, said cam means comprising a cam surface formed on said part and a pin carried by a torque transmitting member and engaging said cam surface.

9. A power assistance steering system as claimed in claims 4, 5 or 7 wherein said sensor means comprises a Hall effect device and a permanent magnet carried by said pinion member or said part, respectively.

10. A power assistance steering system for pivoting steerable wheels in opposite directions in response to manual turning of a steering wheel in respective opposite directions, said power assisted steering system comprising:
- fluid pressure means having opposite chambers for providing power assistance to pivoting of the steerable wheels,
- pump means for selectively directing fluid pressure to said opposite chambers of said fluid pressure means,
- reversible motor means for selectively driving said pump means in opposite directions to provide for selectively directing fluid pressure to said opposite chambers of said fluid pressure means in accordance with the direction of turning of said steering wheel, and
- sensor means for sensing the direction of turning of the steering wheel and for controlling operation of said reversible motor means for selectively driving said pump means in a respective one of said opposite directions in accordance with the direction of turning of the steering wheel.

11. A power assistance steering assembly as claimed in claim 10 wherein said pump means has two ports for alternative connection to a reservoir and a respective one of said opposite chambers of said fluid pressure means.

12. A power assistance steering system as claimed in claim 11 further including two check valves for controlling fluid flow between said reservoir and a respective port.

13. A power assistance steering assembly as claimed in claim 12 further including valve means for controlling fluid flow between said ports and said opposite chambers of said fluid pressure means and between said opposite chambers and said reservoir, respectively.

* * * * *